(12) United States Patent
Watanabe et al.

(10) Patent No.: US 7,739,785 B2
(45) Date of Patent: Jun. 22, 2010

(54) METHOD OF MANUFACTURING A HEAD GIMBAL ASSEMBLY

(75) Inventors: Kenjirou Watanabe, Kanagawa (JP);
Yoshio Uematsu, Kanagawa (JP);
Yousuke Fukumoto, Kanagawa (JP);
Yohtaroh Ichimura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 112 days.

(21) Appl. No.: 11/823,242

(22) Filed: Jun. 26, 2007

(65) Prior Publication Data

US 2008/0092365 A1    Apr. 24, 2008

(30) Foreign Application Priority Data

Jun. 27, 2006  (JP) .............................. 2006-176391

(51) Int. Cl.
*G11B 5/127* (2006.01)
(52) U.S. Cl. .............. 29/603.06; 29/603.07; 29/603.29; 29/603.6; 360/245.8
(58) Field of Classification Search ................ 29/603.6, 29/603.07, 603.29; 360/245.8
See application file for complete search history.

(56) References Cited

U.S. PATENT DOCUMENTS 5,145,101 A * 9/1992 Brown et al. .................. 228/51
7,342,749 B2 * 3/2008 Hashi et al. .............. 360/245.8
2002/0029461 A1 * 3/2002 Kamigama et al. ........ 29/603.06
2003/0005564 A1   1/2003 Wong et al.
2005/0195527 A1 * 9/2005 Yamaguchi .............. 360/234.5
2006/0012918 A1   1/2006 Hashi et al.
2006/0037188 A1   2/2006 Fukaya et al.

FOREIGN PATENT DOCUMENTS

JP          2006-059488           3/2006

* cited by examiner

*Primary Examiner*—Derris H Banks
*Assistant Examiner*—Dan D Le
(74) *Attorney, Agent, or Firm*—Townsend and Townsend and Crew LLP; John Henkhaus

(57) ABSTRACT

Embodiments of the present invention provide a head gimbal assembly manufacturing method which can attach another magnetic head slider to a suspension to be reused without addition of solder. According to one embodiment of the present invention, a head gimbal assembly (HGA) is attached to a jig. Both sides of a portion close to the rear end of a magnetic head slider are gripped with hot tweezers heated at about 200° C. They are heated for about four seconds while applying force in a direction of peeling off the magnetic head slider from gimbals, thus removing the magnetic head slider from the gimbals. When another magnetic head slider is attached to the suspension, an adhesive adhered to the gimbals is removed and another adhesive is applied to the gimbals. The back of another magnetic head slider is pressed to the adhesive, whereby the magnetic head slider is fixed to the gimbals. Next, the solder fillet left on the gimbals is irradiated with laser beams to be melted and joined to an electric terminal.

8 Claims, 4 Drawing Sheets

METHOD OF MANUFACTURING A HEAD GIMBAL ASSEMBLY

CROSS-REFERENCE TO RELATED APPLICATION

The instant nonprovisional patent application claims priority to Japanese Application No. 2006-176391 filed Jun. 27, 2006 and incorporated by reference in its entirety herein for all purposes.

BACKGROUND OF THE INVENTION

Since magnetic disk drives have high-capacity and are capable of fast access, they are incorporated for use in personal computers, servers and the like, and widely used as external storage devices for computer systems. Along with increased recording density, magnetic heads mounted on magnetic disk drives are needed to exhibit significantly high read/write performance. Under such circumstances, head gimbal assemblies in which a slider carrying a magnetic head element is attached to a suspension are subjected to an electrical characteristic inspection. In this inspection, head gimbal assemblies rejected because of defective magnetic head elements have been increased, resulting in a decreased production yield. If the head gimbal assemblies that have been rejected because of the defective magnetic head elements are discarded, scrap cost is increased.

To prevent the increase of the scrap cost, if the suspension itself is not damaged the magnetic head slider has been removed from the suspension for reuse of the suspension. Attachment of the magnetic head slider to the suspension is carried out by fixing the magnetic head slider to the gimbals of the suspension with an adhesive, and joining, by soldering, the pad of an electrical line formed on the gimbals with an electric terminal which is formed on the magnetic head slider and electrically connected to the magnetic head slider. The method which is currently performed to remove the magnetic head slider attached to the suspension in this way is a method of cutting the soldered portion of the magnetic head slider by a blade with the head gimbal assembly fixed to a jig. Another magnetic head slider is fixed, with an adhesive as described above, to the suspension from which the magnetic head slider has been removed by cutting the soldered portion of the magnetic head slider with the blade. Then, the pad of the electrical line on the gimbals is connected to the electrical terminal of the magnetic head slider by supplying another solder thereto. Thus, the suspension is reused.

Japanese Laid-Open Patent No. 2006-59488 ("Patent document 1") discloses a method of removing a magnetic head slider soldered to a suspension for reuse of them by locally heating the soldered joint portion between the magnetic head slider and the suspension by laser irradiation. Patent document 1 teaches that this method eliminates heating the entire head gimbal assembly and can remove the magnetic head slider by melting solder while suppressing excessively heating the magnetic head slider or suspension. However, when a magnetic head slider is removed from a suspension, cracks occur at a solder fillet and at an electric line due to stress during cutting. Furthermore, addition of solder at the time of reusing the suspension causes a problem of reliability.

The method of cutting the soldered portion with a blade is simple because the magnetic head slider can be removed without heating the head gimbal assembly. The study by the present inventors revealed, however, that a crack due to stress encountered during the cutting occurred at the solder fillet left on the pad of the suspension. If the crack is occurring at the solder fillet left, the reuse of the suspension decreases the reliability of the joint portion; therefore, the suspension kept intact cannot be reused. Other solder may be added to the solder fillet left to connect another magnetic head slider to the suspension. This poses a problem of decreased production efficiency resulting from a reduced solder supply rate. On the other hand, it is unpreferable that the suspension be reused by removing the left solder fillet because of the increased number of man-hours. In addition, it is probable that the suspension will be damaged during removal.

While describing the method of removing a magnetic head slider soldered to a suspension, patent document 1 does not describe how to connect a magnetic had slider with the suspension when the suspension is reused. However, when another magnetic head slider is connected to the suspension by soldering, if a solder fillet is left on the suspension, there arises a problem of decreased production efficiency resulting from the reduced solder supply rate as described above.

BRIEF SUMMARY OF THE INVENTION

Embodiments in accordance with the present invention provide a head gimbal assembly manufacturing method which can attach another magnetic head slider to a suspension to be reused without addition of solder. According to the particular embodiment shown in FIG. 2, a head gimbal assembly (HGA) is attached to a jig. Both sides of a portion close to the rear end of a magnetic head slider 10 are gripped with hot tweezers 40 heated at about 200° C. They are heated for about four seconds while applying force in a direction of peeling off the magnetic head slider from gimbals 6, thus removing the magnetic head slider 10 from the gimbals. When another magnetic head slider 100 is attached to the suspension 2, an adhesive 30 adhered to the gimbals 6 is removed and another adhesive 32 is applied to the gimbals 6. The back of another magnetic head slider 100 is pressed to the adhesive 32, whereby the magnetic head slider 100 is fixed to the gimbals 6. Next, the solder fillet 20 left on the gimbals 6 is irradiated with laser beams 52 to be melted and joined to an electric terminal 100b.

DETAILED DESCRIPTION OF THE INVENTION

Embodiments of the present invention relate to a method of reusing a suspension, and more particularly, to a method of removing a magnetic head slider that has been judged to be defective from a suspension and attaching another magnetic head slider to the suspension, thereby providing a head gimbal assembly.

It is an object of embodiments of the present invention to provide a head gimbal assembly manufacturing method which can attach another magnetic head slider to a suspension to be reused without addition of solder.

To achieve the above object, a method of manufacturing a head gimbal assembly, according to embodiments of the present invention includes the steps of: attaching a head gimbal assembly to a fixing jig, the head gimbal assembly being configured such that a magnetic head slider is fixed to gimbals of a suspension with an adhesive and an electric terminal of the magnetic head slider is connected to an electric line laminated on the gimbals with a solder fillet; separating the magnetic head slider from the gimbals by applying force to the head slider in a direction of peeling off the head slider from the gimbals while heating the head slider with a heating member, and removing the head slider from joint by the solder fillet while leaving the solder fillet on the electric line; removing the adhesive left on the gimbals of the suspension; applying an adhesive to the gimbals; fixing another magnetic head slider to the gimbals with the adhesive applied; and joining the solder fillet to an electric terminal of the another magnetic head slider by heating the solder fillet left.

In the step of removing the magnetic head slider from the suspension, the solder fillet is not melted.

The solder fillet has a melting point higher than that of the adhesive used to fix the magnetic head slider.

It may be preferable that the heating member heats a portion closer to a rear end than to a central portion of the magnetic head slider, the portion being located on the side opposite to the joint portion of the solder fillet.

It may be preferable that a gap be provided to have a distance of 5 to 15 μm between an electric terminal of another magnetic head slider fixed to the flexure with another adhesive and the solder fillet left on the electric line.

According to embodiments of the present invention, a magnetic head slider which is defective is removed from a suspension and another magnetic head slider can be connected to the suspension without addition of solder with a high degree of reliability.

An embodiment of the present invention is below described in detail with reference to the drawings.

Figure 3:
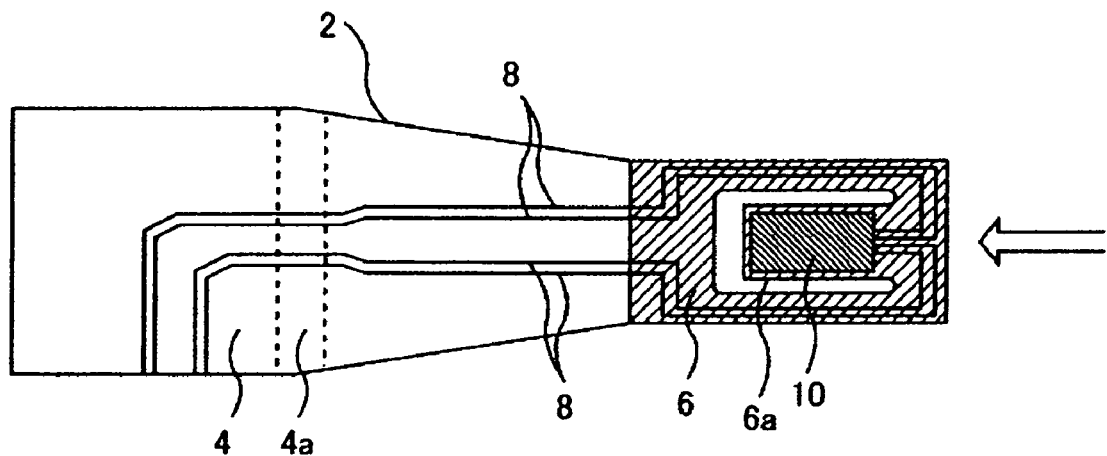
FIG. 3 is a plan view illustrating the entire configuration of a head gimbal assembly.
Figure 4:
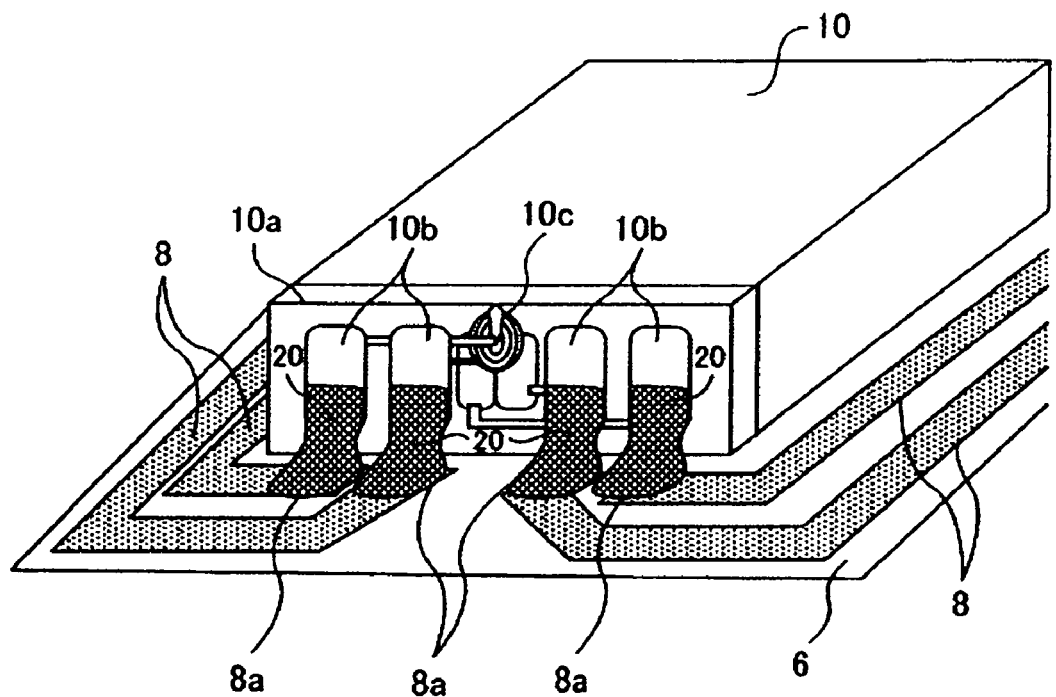
FIG. 4 is a perspective view of a magnetic head slider attached to the gimbals of the head gimbal assembly.

A description is first made of the entire configuration of a head gimbal assembly to which an embodiment of the present invention is applied and a connection structure of gimbals with a magnetic head slider. FIG. 3 is a plan view of a head gimbal assembly and FIG. 4 is a schematic view illustrating a state in which the magnetic head slider is connected to the gimbals as viewed from the arrow direction of FIG. 3. In FIG. 3, a suspension 2 is a thin plate-like member in which gimbals 6 is attached to one end of a load beam 4. A magnetic head slider 10 is attached to a tongue portion 6a of the gimbals 6. A construct in which the magnetic head slider 10 is attached to the gimbals 6 of the suspension 2 is called a head gimbal assembly (hereunder, which is abbreviated as the HGA). The load beam 4 has a spring part 4a, which applies a load to the magnetic head slider 10 via a dimple not shown. The magnetic head slider 10 is such that its back face opposite to an air bearing surface is fastened to the tongue portion 6a of the gimbals 6 with an adhesive such as resin. Four electric lines 8 are laminated on the load beam 4 and the gimbals 6. One end of each electric line 8 is connected to a preamplifier not shown. Pads 8a are each placed on the other end of each electric line 8. The pads 8a are respectively connected to four electric terminals 10b formed on a head element portion 10a of the magnetic head slider 10 with solder fillets 20. The solder used here is a Pb-free solder ball, whose melting point is 214° C. The electric terminals 10b are respectively connected to the leading lines of read and write elements of a magnetic head 10c formed inside the head element portion 10a.

A description is next made of a head gimbal assembly manufacturing method according to an embodiment with reference to FIGS. 1(a)-1(b) and 2(a)-2(c). As shown in FIGS. 3 and 4, the magnetic head slider 10 is fastened with an adhesive and electrically connected by soldering to the gimbals 6 of the suspension 2. Thereafter, the read and write performance of the magnetic head 10c is inspected. If the magnetic head slider 10 is judged to be rejected because of the defective magnetic head 10c, the magnetic head slider 10 mounted with the magnetic head 10c which is a defective is removed from the suspension 2 and another magnetic head slider 100 is attached to the suspension 2 according to the following procedure.

Figure 1A:
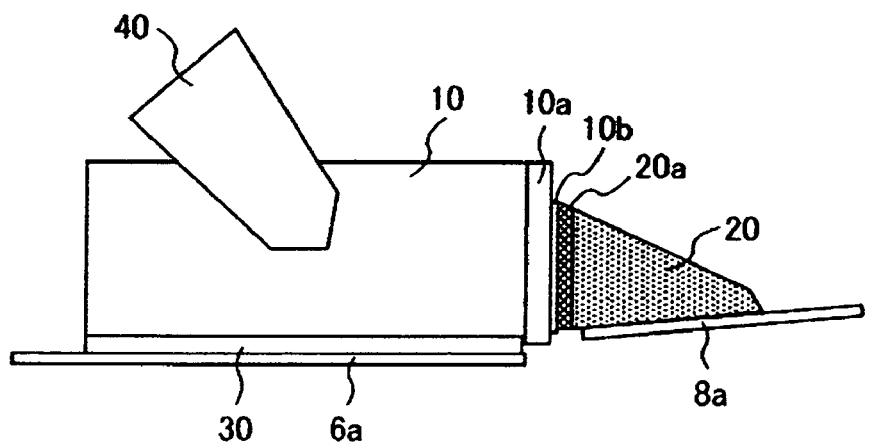
FIGS. 1(a) and 1(b) illustrate a process for removing a magnetic head slider from a suspension according to an embodiment of the present invention.

FIG. 1(a) is a side view of FIG. 4 and illustrates a portion in which the magnetic slider 10 is fixed to the gimbals 6 of the suspension 2. The HGA is attached to a fixing jig not shown. Both sides of a portion closer to the rear end than to the central portion of the magnetic head slider 10 are gripped with hot tweezers which is a heating member heated at about 200° C. The magnetic head slider 10 is heated for about four seconds while applying force in a direction of peeling off the magnetic head slider 10 from the gimbals 6. Thus, the portion closer to the rear end (the side opposite to the joint portion 20a of the solder fillet 20) than to the central portion of the magnetic head slider 10 is gripped by the hot tweezers 40 so as to transfer heat to the joint portion with the adhesive 30 but so as not to transfer heat to the joint portion between the solder fillet 20 and the pad 8a.

Figure 1B:
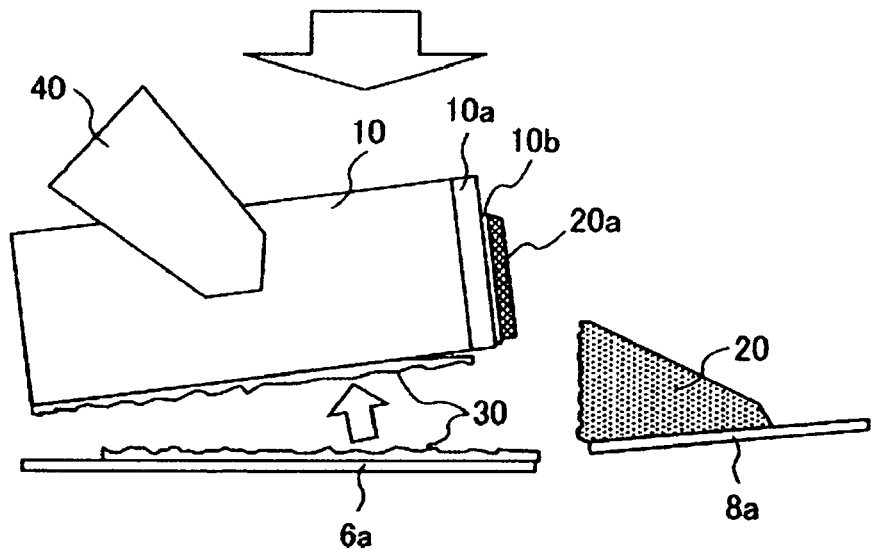

In this way, the fixed portion of the magnetic head slider 10 with the adhesive 30 is heated and pulled, whereby, as shown in FIG. 1(b), the adhesive 30 lower in melting point than the solder ball is melted, and the magnetic head slider 10 is peeled off (separated) from the tongue portion 6a of the gimbals 6. Subsequently, the joint portion 20a of the solder fillet 20 with the electric terminal 10b is broken and consequently the magnetic head slider 10 is completely removed from the suspension 2.

The connection is made by the solder fillet, as solder, comprising four kinds of Au—Sn alloy layers. Therefore, if the magnetic head slider 10 is heated for appropriate time while pulling it as described above, the alloy layer 20a which is weakest in strength in the solder fillet 20 is broken before the joint portion of the solder fillet 20 with the pad 8a is heated. In the state where the magnetic head slider 10 is removed, most of the solder fillet 20 is left on the pad 8a as shown in FIG. 1(b). In this way, when the magnetic head slider 10 is removed, the solder fillet 20 is left, being not melted, on the side of the suspension in the original shape. This makes it possible to attach another magnetic head slider to the suspension 2 without supply of other solder when the suspension 2 is reused.

Figure 2A:
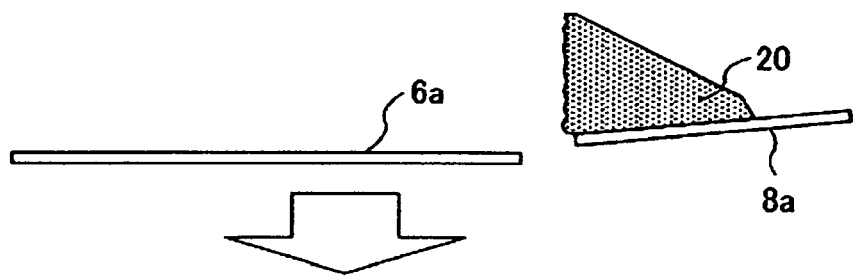
FIGS. 2(a)-2(c) illustrate a process for attaching another magnetic head slider to a suspension to be reused according to an embodiment of the present invention.
Figure 2B:
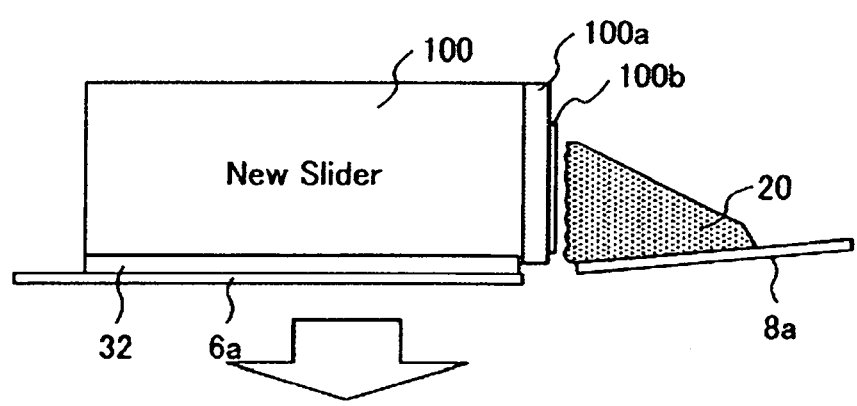

A description is next made of a procedure for attaching another magnetic head slider 100 to the suspension 2 to be reused with reference to FIG. 2. As shown in FIG. 1(b), since adhering to the tongue portion 6a of the gimbals 6, the adhesive 30 is first removed by dipping the suspension 2 in a solvent such as alcohol for cleaning. FIG. 2(a) shows the tongue portion 6a of the gimbals 6 from which the adhesive 30 is removed. Next, the suspension 2 is attached to a fixing jig, as shown in FIG. 2(b), and another adhesive 32 is applied to the tongue portion 6a of the gimbals 6. In addition, the back of another magnetic head slider 100 is pressed to the adhesive 32 and thus, the magnetic head slider 100 is fastened to the tongue portion 6a of the gimbals 6. In this case, if a gap is provided between the electric terminal 100b of the magnetic head slider 100 and the solder fillet 20, the magnetic head slider can be attached to the tongue portion 6a while coming into noncontact with the solder fillet. It is desirable that the gap has a distance of 5 to 15 μm.

Figure 2C:
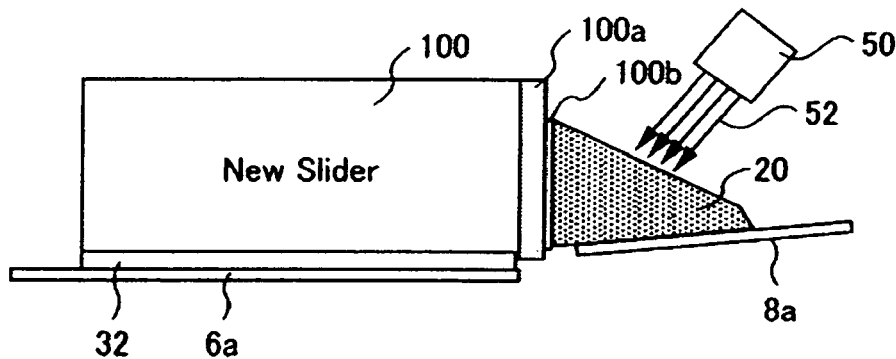

Next, the pad 8a of the electric line is electrically connected to the electric terminal 100b of the magnetic head slider 100. In this case, since the solder fillet 20 that has been used previously is left as it is on the pad 8a of the electric line, it is not necessary to supply other solder. Therefore, as shown in FIG. 2(c), the solder fillet 20 thus left is irradiated with laser beams 52 from a laser irradiation apparatus 50. The solder fillet 20 heated by the laser beams 52 is melted to extend toward the electric terminal 100b and comes into contact with and joins to the electric terminal 100b.

In this way, other solder is not added to the HGA in which another magnetic head slider 100 is attached to the suspension 2 to be reused; therefore, reliability of the connection will not decrease.

Figure 5:
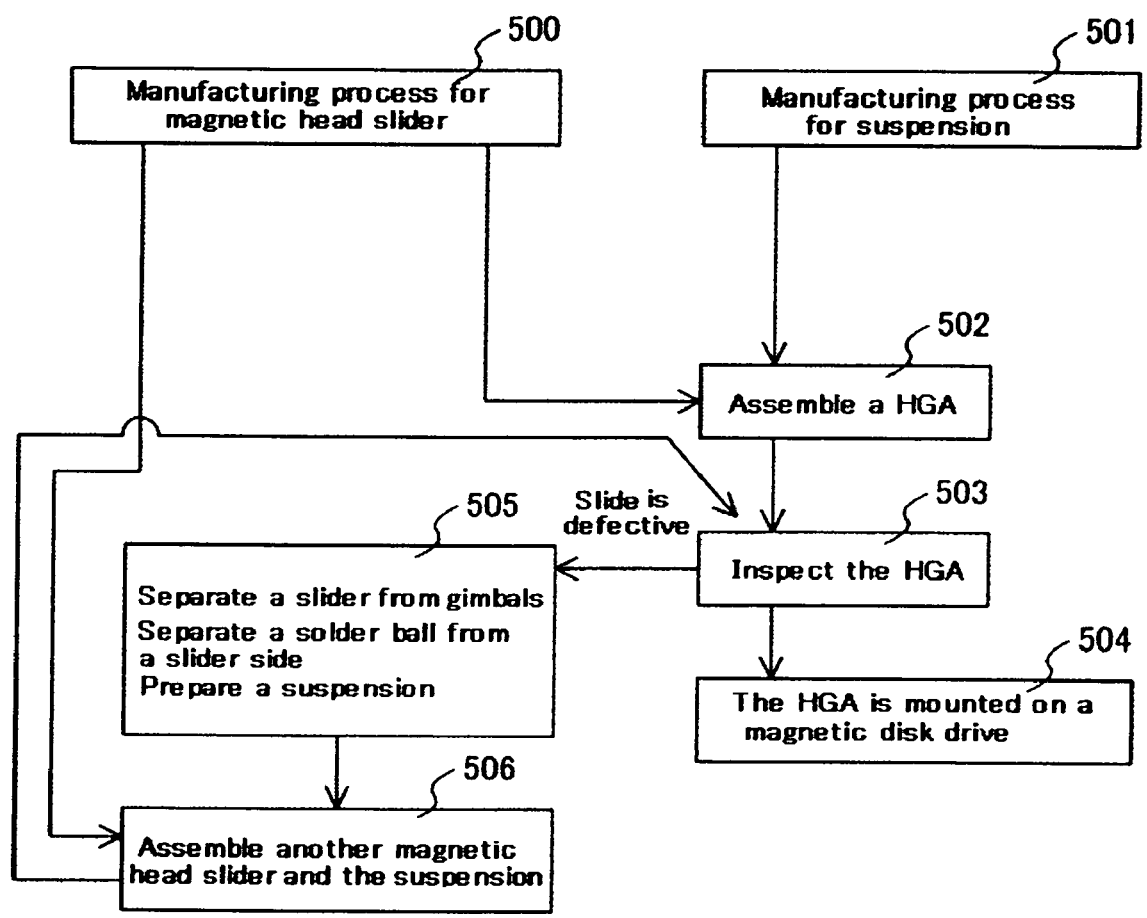
FIG. 5 is a process chart of a method of manufacturing the head gimbal assembly according to an embodiment of the present invention.

The description is made of the process for removing a magnetic head slider which is defective from a suspension and the process for attaching another magnetic head slider to the suspension thus far, in the method of manufacturing a head gimbal assembly. A series of manufacturing processes are described with reference to FIG. 5. In step 500, magnetic head sliders are manufactured and inspected and accepted products are prepared. In step 501, suspensions are manufactured and inspected and accepted products are prepared. Subsequently in step 502, the magnetic head slider is attached to the suspension to assemble an HGA (see FIG. 3). Then in step 503, the HGA is inspected to find a defective magnetic head slider or suspension. If the inspection of step 503 finds no defects, the HGA is accepted. In step 504, the accepted HGA is mounted on a magnetic disk drive.

In step 503, if a magnetic head slider is found to be defective, it is separated from the gimbals and from the solder fillet so that a suspension to be reused is prepared as explained with reference to FIG. 1(a) and FIG. 1(b). Subsequently, in step 506, another magnetic head slider that has been prepared in step 500 is attached to the suspension prepared to assemble a HGA. The HGA thus assembled is inspected in step 503 and if accepted, it is mounted on a magnetic disk drive.

As described above, according to embodiments of the present invention, when the magnetic head slider that has been found to be defective is removed from the suspension of the HGA, most of the solder fillet can be left on the side of the suspension. Since the joint portion of the solder fillet with the suspension will not crack, the suspension can be reused while keeping a satisfactory joined state. When this suspension is reused, another magnetic head slider can be attached to the suspension without supply of other solder. Thus, there arises no problem of reliability relative to the connection between the suspension that has been reused and another magnetic head slider by soldering.

What is claimed is:

1. A method of manufacturing a head gimbal assembly, comprising the steps of:
   attaching a head gimbal assembly to a fixing jig, the head gimbal assembly being configured such that a magnetic head slider is fixed to gimbals of a suspension with an adhesive and an electric terminal of the magnetic head slider is connected to an electric line laminated on the gimbals with a solder fillet;
   separating the magnetic head slider from the gimbals by applying force to the head slider in a direction of peeling off the head slider from the gimbals while heating the head slider with a heating member, and removing the head slider from joint by the solder fillet while leaving most of the solder fillet on the electric line;
   removing the adhesive left on the gimbals of the suspension;
   applying an adhesive to the gimbals;
   fixing another magnetic head slider to the gimbals with the adhesive applied; and
   joining the solder fillet to an electric terminal of the another magnetic head slider by heating the solder fillet left without supply of other solder.

2. The method according to claim 1, wherein in the step of removing the magnetic head slider from the suspension, the solder fillet is not melted.

3. The method according to claim 1, wherein the solder fillet has a melting point higher than that of the adhesive used to fix the magnetic head slider.

4. The method according to claim 1, wherein the heating member heats a portion closer to a rear end than to a central portion of the magnetic head slider, the portion being located on the side opposite to the joint portion of the solder fillet.

5. The method according to claim 1, wherein the heating temperature of the heating member is about 200° C. and the heating time of the heating member is about four seconds.

6. The method according to claim 1, wherein the heating member is hot tweezers which heats the portion of the magnetic head slider by gripping both sides of the magnetic head slider.

7. The method according to claim 1, wherein a gap is provided to have a distance of about 5 to 15 μm between an electric terminal of another magnetic head slider fixed to the gimbals and the solder fillet left on the electric line.

8. The method according to claim 1, wherein the solder fillet left on the electric line is heated by laser beam irradiation.

* * * * *